United States Patent
Sedoshkin et al.

(10) Patent No.: US 12,035,075 B1
(45) Date of Patent: Jul. 9, 2024

(54) EMBODIED INTERFACE FOR FACE-TO-FACE COMMUNICATION BETWEEN HUMANS AND ARTIFICIAL INTELLIGENCE AGENTS

(71) Applicant: Dragon Tree Partners LLC, Dover, DE (US)

(72) Inventors: Ilia Sedoshkin, Dubai (AE); Yury Rumyantsev, Moscow (RU); Anton Stepanov, Moscow (RU); Egor Aleksandrov, Moscow (RU)

(73) Assignee: Dragon Tree Partners LLC, Dover, DE (US)

( * ) Notice: Subject to any disclaimer, the term of this patent is extended or adjusted under 35 U.S.C. 154(b) by 0 days.

(21) Appl. No.: 18/545,238

(22) Filed: Dec. 19, 2023

Related U.S. Application Data

(60) Provisional application No. 63/433,500, filed on Dec. 19, 2022.

(51) Int. Cl.
| | |
|---|---|
| *H04N 7/15* | (2006.01) |
| *G06F 3/14* | (2006.01) |
| *G06T 13/40* | (2011.01) |
| *G06V 10/40* | (2022.01) |
| *G06V 40/16* | (2022.01) |
| *G10L 15/02* | (2006.01) |

(Continued)

(52) U.S. Cl.
CPC ........... *H04N 7/157* (2013.01); *G06F 3/1446* (2013.01); *G06T 13/40* (2013.01); *G06V 10/40* (2022.01); *G06V 40/172* (2022.01); *G06V 40/174* (2022.01); *G10L 15/02* (2013.01); *G10L 17/00* (2013.01); *G10L 25/63* (2013.01); *H04N 7/141* (2013.01)

(58) Field of Classification Search
CPC ...... H04N 7/157; H04N 7/141; G06V 40/174; G06V 40/172; G06V 10/40; G06F 3/1446; G06T 13/40; G10L 15/02; G10L 17/00; G10L 25/63
See application file for complete search history.

(56) References Cited

U.S. PATENT DOCUMENTS

| | | | | | |
|---|---|---|---|---|---|
| 5,562,459 | A | * | 10/1996 | Durlach | G09F 11/025 345/110 |
| 6,594,930 | B1 | * | 7/2003 | Segan | G09F 11/025 40/503 |

(Continued)

*Primary Examiner* — Olisa Anwah
(74) *Attorney, Agent, or Firm* — Georgiy L. Khayet

(57) ABSTRACT

A method for providing embodied interface for face-to-face communication between humans and artificial intelligence agents is disclosed. An example method includes generating, based on an avatar model, a data stream including an image of a face of the avatar model, audio data of a speech of the avatar model, and a rotation instruction; and transmitting the data stream to a three-dimensional video call system including a stand, an axle extended from the stand, a plurality of display devices attached to the axle, and a controller. The display devices display portions of the image of the face and play back the audio data. The actuator rotates the axle according to the rotation instruction. The controller analyzes an ambient video signal and an ambient acoustic signal to obtain environmental features and transmits the environmental features to the avatar model. The environmental features include an emotional state and facial expression of the user.

20 Claims, 8 Drawing Sheets

(51) Int. Cl.
*G10L 17/00* (2013.01)
*G10L 25/63* (2013.01)
*H04N 7/14* (2006.01)

(56) References Cited

U.S. PATENT DOCUMENTS

| | | | |
|---|---|---|---|
| 9,531,996 B1* | 12/2016 | Duys | H04N 7/15 |
| 2010/0118112 A1* | 5/2010 | Nimri | H04N 7/142 |
| | | | 348/E7.083 |
| 2016/0006987 A1* | 1/2016 | Li | G06V 40/174 |
| | | | 348/14.03 |
| 2019/0004568 A1* | 1/2019 | Kaya | G06F 1/1647 |
| 2021/0247020 A1* | 8/2021 | Janechek | F16M 11/2042 |
| 2023/0086632 A1* | 3/2023 | Park | H04N 23/69 |
| | | | 348/14.02 |
| 2024/0005579 A1* | 1/2024 | Gonzalez Franco | G06T 15/20 |

\* cited by examiner

EMBODIED INTERFACE FOR FACE-TO-FACE COMMUNICATION BETWEEN HUMANS AND ARTIFICIAL INTELLIGENCE AGENTS

CROSS-REFERENCE TO RELATED APPLICATIONS

The present application claims priority of U.S. Provisional Patent Application No. 63/433,500 filed on Dec. 19, 2022, entitled "SPATIAL CONTROLLABLE THREE-DIMENSIONAL VIDEO CALL SYSTEM." The subject matter of aforementioned application is incorporated herein by reference in its entirety for all purposes.

TECHNICAL FIELD

This disclosure generally relates to video calls. More particularly, this disclosure relates to systems and methods for providing embodied interface for face-to-face communication between humans and artificial intelligence (AI) agents.

BACKGROUND

Video calls have become standard communication tools in many applications, such as business meetings, educational classes, and entertainment. However, during a standard video call conducted via a computing device, an image of a remote speaker is displayed on a flat two-dimensional screen that does not provide another participant of the video call with the correct perception of speaking to a real person and engagement in process of speaking. Another shortcoming of existing video call systems is that when the participant conducts a video call with an AI avatar model, the AI avatar model does not recognize emotions of the participant. This may result in wrong reactions of the AI model to the words the participant utters during the video call. Therefore, improvements to the technology of video calls are desired to overcome the indicated shortcomings of standard video calls.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to an example embodiment, a method for providing embodied interface for face-to-face communication between humans and AI agents is disclosed. The method may include generating, by at least one processor and based on an avatar model, a data stream. The data stream may include at least one image of a face associated with the avatar model, audio data associated with a speech of the avatar model, and a rotation instruction. The method may include transmitting, by the processor, the data stream to a three-dimensional (3D) video call system. The 3D video call system may include a stand, an axle extended from the stand, a controller, at least one acoustic sensor coupled with the controller and configured to sense an ambient acoustic signal in an ambient environment, a video camera coupled with the controller and configured to capture an ambient video signal in the ambient environment, at least one actuator coupled with the controller and configured to rotate the axle, and a plurality of display devices attached to the axle and communicatively coupled with the controller. The controller can be configured to cause a display device of the plurality of display devices to display a portion of the at least one image of the face, thereby causing the plurality of display devices to display a 3D image of the face. The controller can be configured to cause the display device to play back the audio data. The controller can be configured to cause the actuator to rotate the axle according to the rotation instruction. The controller can be configured to analyze the ambient video signal to obtain at least one environmental feature. The controller can be configured to transmit the environmental feature to the processor.

The processor can be located remotely with respect to the 3D video call system. The environmental feature includes a total number of people present in the ambient environment, a number of people present in the ambient environment and speaking to the avatar model, and a position of a person present in the ambient environment and currently speaking to the avatar model. The processor can be configured to determine, based on the position, a further rotation instruction and transmit the further rotation instruction to the 3D video call system, wherein the controller causes the at least one actuator to rotate the axle according to the further rotation instruction.

The environmental feature may include a unique identifier of a person present in the ambient environment. The unique identifier can be determined based on one of the following: an image of the person and a voice of the person. The processor can be configured to transmit further instruction to the 3D video call system. Further instruction may include a command to rotate the axle to a position of the person associated with the unique identifier.

The controller can be configured to analyze the ambient video signal to detect the presence of a new person in the ambient environment. Based on analysis, the controller may determine at least one characteristic of the new person. The characteristic can be used by the controller to recognize the new person in the ambient video signal and the ambient acoustic signal. The controller may transmit, to the processor, an indication of the presence of the new person in the ambient environment. In response to the indication of the presence of the new person, the processor can transmit a further instruction to the 3D video call system. Further instruction may include a command to rotate the axle to the position of the new person.

The controller can be configured to analyze the ambient acoustic signal and the ambient video signal to detect an emotional state of a person present in the ambient environment and currently speaking to the avatar model. The controller may transmit the emotional state of the person to the processor. The processor is configured to adjust, based on the emotional state of the person and the avatar model, one of the following: the image of the face and the audio data in the data stream. The adjustment of the image may include changing facial expression of the face associated with the avatar model.

According to another embodiment, a system for providing embodied interface for face-to-face communication between humans and AI agents is disclosed. The system may include at least one processor and a memory storing processor-executable codes, wherein the processor can be configured to implement the operations of the above-mentioned method for conducting video calls between people and avatar model is provided.

According to yet another aspect of the disclosure, there is provided a non-transitory processor-readable medium, which stores processor-readable instructions. When the processor-readable instructions are executed by a processor, they cause the processor to implement the above-mentioned method for providing embodied interface for face-to-face communication between humans and AI agents.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

DETAILED DESCRIPTION

Figure 1:
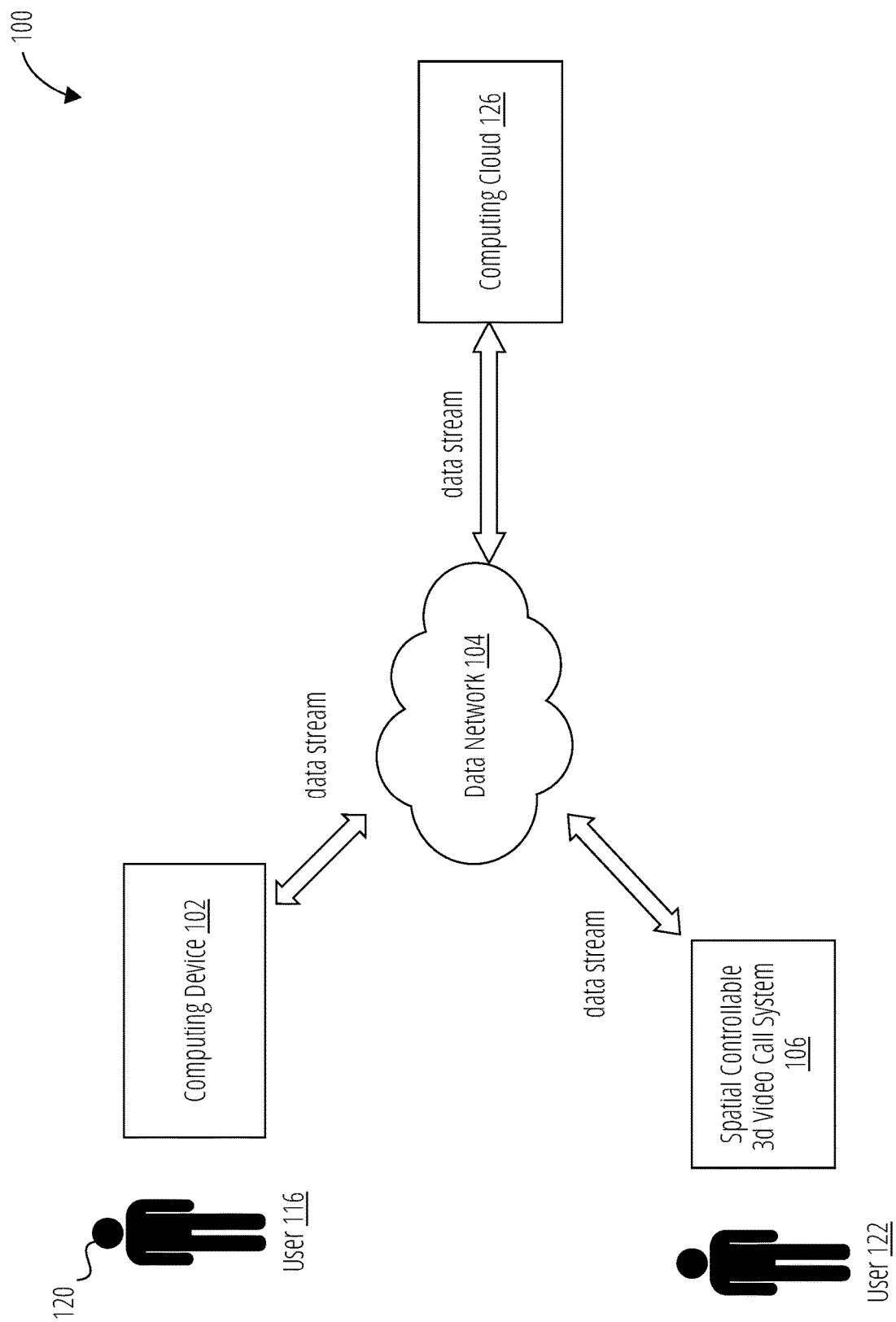
FIG. 1 illustrates an example environment, wherein a spatial controllable 3D video call system can be implemented, according to some example embodiments of the present disclosure.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and operational changes can be made without departing from the scope of what is claimed. The following detailed description is, therefore, not to be taken in a limiting sense, and the scope is defined by the appended claims and their equivalents.

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Some embodiments of the present disclosure may provide a spatial controllable 3D video call system. The spatial controllable 3D video call system may include a stand, an axle extended from the stand, a controller, at least one acoustic sensor, a video camera, actuators configured to rotate and tilt axle, and a plurality of display devices attached to the axle. The display devices can be communicatively coupled with the controller. In some embodiments, the controller can be configured to receive a data stream. The data stream may include at least one image of a face associated with an avatar model, audio data associated with a speech of the avatar model, and a rotation instruction. The controller can be configured to cause a display device of the plurality of display devices to display a portion of the at least one image of the face, thereby causing the plurality of display devices to display a 3D image of the face. The controller can be configured to play back the audio data. The controller can be configured to cause the actuator to rotate the axle according to the rotation instruction. The controller can be configured to analyze the ambient video signal captured by the video camera and the ambient video signal recorded by acoustic sensor to obtain at least one environmental feature. The controller may transmit the at least one environmental feature to the avatar model.

In other embodiments, the controller can be configured to receive a plurality of portions of an image of the head of a person in a video stream and cause each of the display devices to display one of the portions of the image of the head of the person. Effectively, the controller causes the plurality of display devices to display a 3D image of the head. The spatial controllable 3D video call system may further include an actuator communicatively coupled with the controller and configured to rotate the axle. The controller can be configured to receive an angular speed of rotation and cause the actuator to rotate the axle with the angular speed of rotation. The video stream and the angular speed of rotation can be received from a remote computing device associated with the person. The remote computing device may monitor an angle of turns of head of the person and convert the angle of turns to the angular speed of rotation.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skills in the art that the present disclosure may be practiced without these specific details. In other instances, well-known methods, procedures, components, and circuits have not been described in detail so as not to unnecessarily obscure aspects of the embodiments.

FIG. 1 depicts an example environment 100, wherein a spatial controllable 3D video call system can be implemented, according to some example embodiments of the present disclosure. Environment 100 may include a computing device 102, a data network 104, a computing cloud 126, and a spatial controllable 3D video call system 106.

Computing device 102 may include a personal computer (PC), a laptop, a mobile phone, smartphone, or tablet computer, netbook, set top box, television device, multimedia device, personal digital assistant, game console, entertainment system, infotainment system, vehicle computer, or any other computing device.

Computing cloud 126 (also referred to as cloud-based computing resource) can be shared by multiple users and can be dynamically re-allocated based on demand. The cloud-based computing resources can include one or more server farms/clusters including a collection of computer servers which can be co-located with network switches and/or routers.

Data network 104 may include Internet, a Wide Area Network (WAN), a Local Area Network (LAN), a cellular network, and so forth.

Computing device 102 can communicate with spatial controllable 3D video call system 106 via data network 104 and computing cloud 126 (shown in FIG. 1). The spatial controllable 3D video call system 106 is described in detail with reference to FIG. 2.

Figure 2:
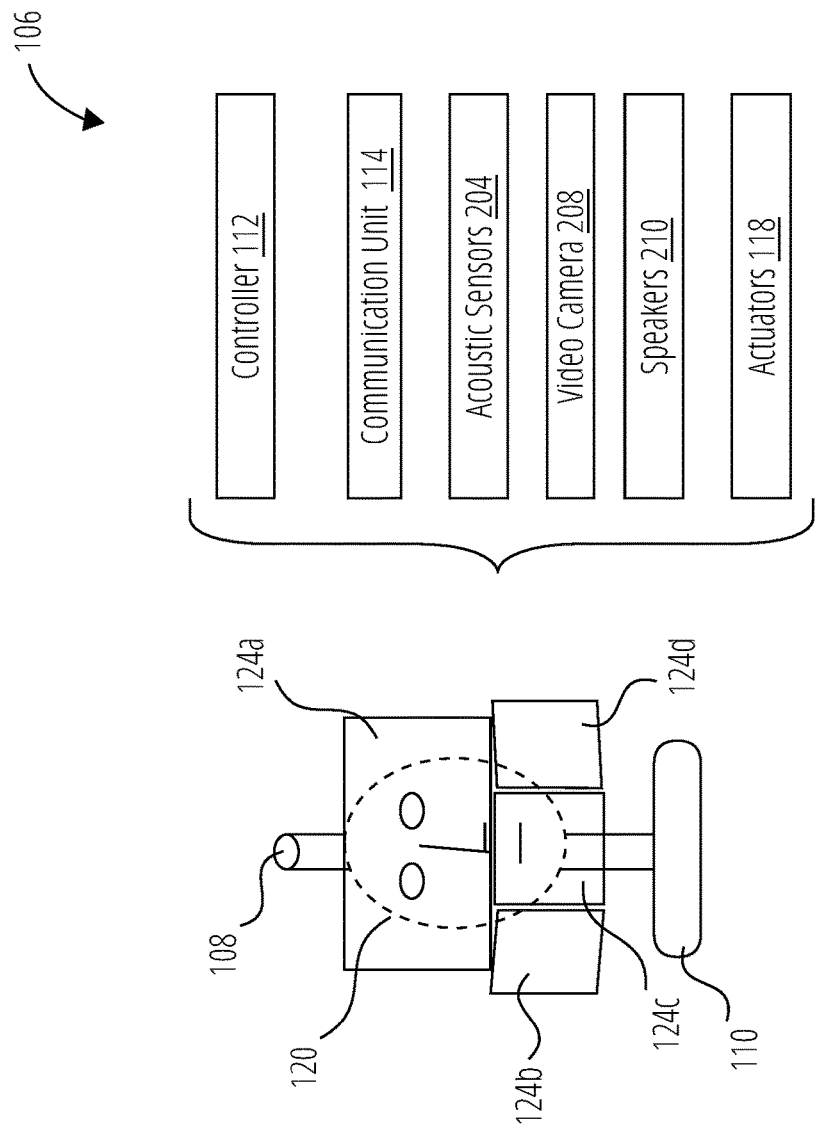
FIG. 2 illustrates an aspect of the subject matter in accordance with one embodiment.

FIG. 2 shows an example spatial controllable 3D video call system 106, according to some example embodiments of the present disclosure. The spatial controllable 3D video call system 106 may include an axle 108, a stand 110, display devices 124a-d, a controller 112, a communication unit 114, an acoustic sensor 204, video camera 208, speakers 210, and actuators 118. The spatial controllable 3D video call system 106 may include a power supply. In other embodiments, the spatial controllable 3D video call system 106 may receive an electrical power via a port, such as a Universal Serial Type (USB), USB-Type C, and so forth.

The display devices 124a-d may include a smartphone, a tablet PC, or any other computing devices including a graphic display system. The display devices 124a-d can be attached to the axle 108 using fastening devices. For example, the fastening device may include mounting devices for smartphones that are used for cycling, running, driving, and so forth. The display devices 124a-d can be attached to the axle 108 in a such way that when the axle 108 rotates around its own axis, the display devices 124a-d are rotating together with the axle 108. The number of the display devices 124a-d and arrangement of the display devices 124a-d around the axle 108 may be different from those shown in FIG. 2. The shape of the display devices 124a-d can also be different from those shown in FIG. 2. For example, one of the display devices 124a and 124c can be replaced by a single T-shaped display device. In some embodiments, the display devices 124a-d can be replaced by a flexible display device that can adopt a curved shape similar to the shape of a human face.

The communication unit 114 may include a Global System for Mobile communications (GSM) module, a Wi-Fi™ module, a Bluetooth™ module, a near field communication module, and the like. In other embodiments, communication unit 114 may include an USB port, an USB-Type C port, and the like.

In some embodiments, controller 112 can be configured to receive, via the communication unit 114, a data stream. The data stream may include an image of a face, audio data including a speech, and rotation instructions. Controller 112 may distribute portions of the image of the face between the display devices 124a-d. Each of the display devices 124a-d can display one of the portions of the image. In entire, the display devices 124a-d may create an effect of a 3D image of the face by simultaneously displaying all the portions. In the embodiments, where the display devices 124a-d are replaced with a flexible display device, the controller may utilize a 3D rendering model to display the face from multiple points of views.

In some embodiments, the data stream can be received from computing device 102 (shown in FIG. 1). In certain embodiments, the division of the image of the face into the plurality of portions can be carried out by an application executed on the computing device 102. In these embodiments, the plurality of portions can be included into the data stream sent by the computing device 102 to the controller 112. In other embodiments, controller 112 can be configured to divide image in the data stream into the plurality of portions and distribute the portions between the display devices 124a-d.

Controller 112 may play back audio data from the data stream via speakers 210. Video camera 208 may be configured to capture a reverse video stream. In some embodiments, video camera 208 can be attached or integrated into to the axle 108 in a such way that when the axle 108 rotates around its own axis, video camera 208 rotates together with the axle 108. The reverse video stream can be transmitted by controller 112 via communication unit 114 back to computing device 102.

Controller 112 can also control rotation of axle 108 based on rotation instructions in the data stream by providing corresponding commands to actuators 118. Actuators 118 may include a first motor configured to rotate axle 108 around stand 110 and a second motor configured to change the tilt angle of axle 108 with respect to stand 110. In certain embodiments, display device 124a may include a smartphone. In these embodiments, the controller 112 can be the microprocessor of display device 124a, communication unit 114 can be the communication unit of display device 124a, acoustic sensor 202 can be microphones of display device 124a, speakers 210 can be speakers of display device 124a, and video camera 208 can be a front camera of display device 124a. Thus, in these embodiments, rotating axle 108 around stand 110 and changing the tilt angle of axle 108 with respect to stand 110 may change an orientation of the front camera of display device 124a. The orientation of the front camera of display device 124a is also referred to as a line of sight of the spatial controllable 3D video call system 106.

Referring back to FIG. 1, the spatial controllable 3D video call system 106 can be used for one or more of the following applications.

1. A user to a user video call. In these embodiments, the audio and video data of the data stream can be captured directly by a video camera and a microphone of computing device 102 during a video call between a user 116 and a user 122. The audio and video data can be generated by a video call application, for example Skype™, Zoom™, Vonage™, and so forth. In some embodiments, the computing device 102 may provide a user interface allowing the user 116 to control rotation of the axle 108 and, thereby, change the orientation of the front camera of the display device 124a. The front camera of the display device 124a may be configured to capture a reverse video stream transmitted back to the computing device 102 during a video call. Details of the user interface are described in more detail with reference to FIG. 5 and FIG. 6.

In certain embodiments, the spatial controllable 3D video call system 106 can be used in education services (for example, during virtual classes). Having an image of a tutor displayed via spatial controllable 3D video call system 106 may help a student or a child to concentrate during the virtual classes.

2. Hybrid meetings. In these embodiments, the spatial controllable 3D video call system 106 can be used in a hybrid business meeting, where some of participants are located in a room and other participants are in remote locations. The images of the remote participants can be translated via multiple spatial controllable 3D video call systems 106 located in the room. Each of the remote participants can be able to control an angle of direction of corresponding spatial controllable 3D video call systems using a user interface of an application running on their computing devices. For example, a remote participant may turn the corresponding spatial controllable 3D video call system towards a particular person in the room, thereby giving the person the impression that the remote participant is talking to him or her at the moment. Details of the user interface are described in more detail with reference to FIG. 5 and FIG. 6.

3. Viewing a video featuring a face. In these embodiments, a spatial controllable 3D video call system can be used to display a video from a computing device. For example, the spatial controllable 3D video call system can be connected directly to the computing device. A user can launch an application for displaying a video stored on the computing device or on the Internet. The user may also open a webpage in an Internet browser, where the webpage allows displaying a video. The computing device can stream, to the spatial controllable 3D video call system, a portion of the video that includes the face. As a result, the spatial controllable 3D video call system may display the face from the video. Alternatively, the video can be stored in a memory of the spatial controllable 3D video call system, where the controller of the spatial controllable 3D video call system can display the video using displays of the spatial controllable 3D video call system. In these embodiments, the controller may monitor turns of the face in the video and rotate the axle of spatial controllable 3D video call system in directions of the turns.

4. Interaction with an AI avatar model. In these embodiments, spatial controllable 3D video call system 106 can be used for communication with AI virtual models of famous people or fictional characters. In these embodiments, an image of the face and speech of a famous person (alive or deceased) or a fictional character can be generated by an AI avatar model. Details of these embodiments are described in more detail with reference to FIG. 3 and FIG. 4.

Figure 3:
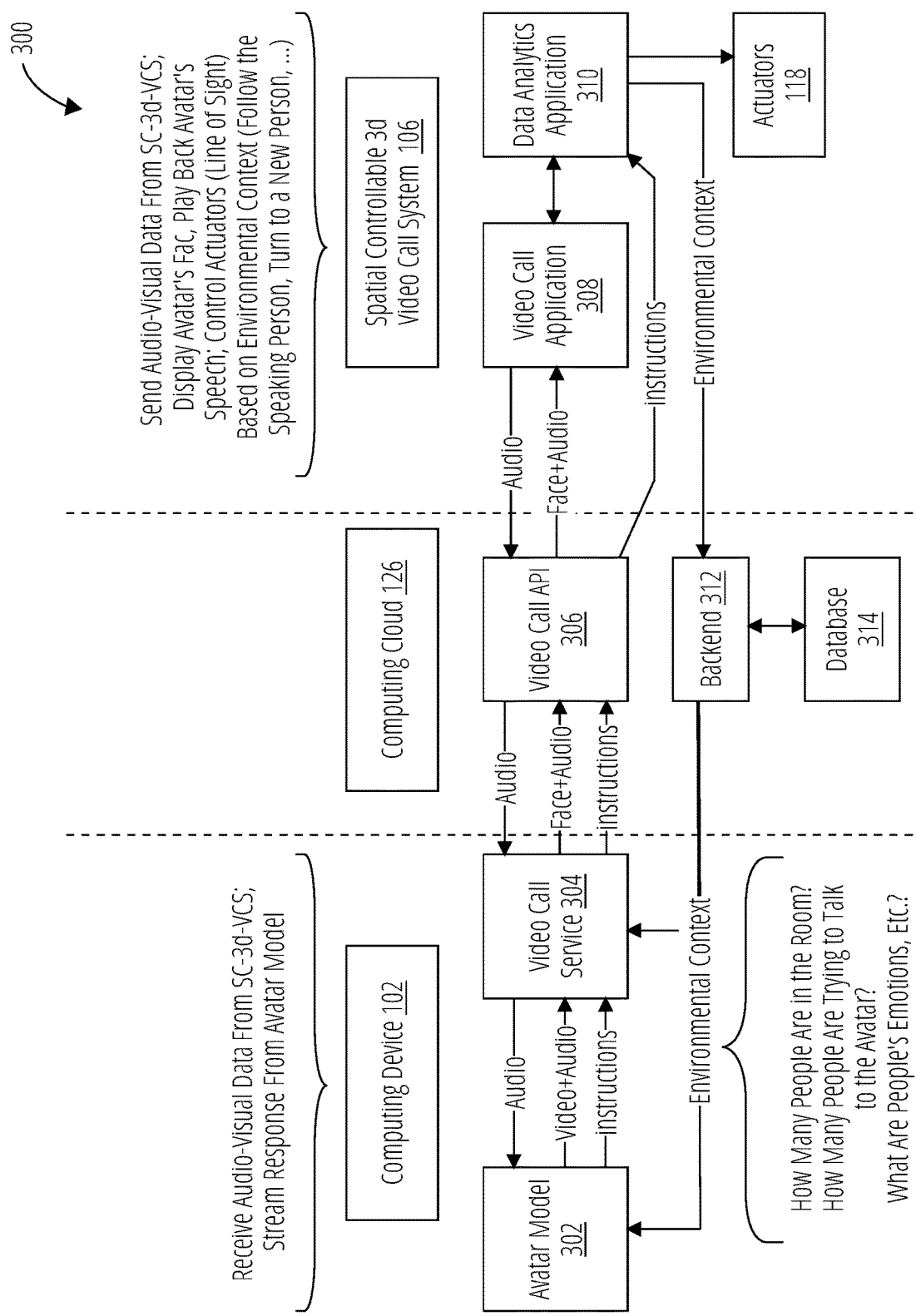
FIG. 3 is scheme 300 showing details of communications of one or more users with an AI avatar model, according to various example embodiments of the present disclosure.

FIG. 3 is a flowchart 300 showing details of communications of one or more users with an AI avatar model, according to various example embodiments of the present disclosure. In embodiment shown in FIG. 3, the computing device 102 can be configured to run an avatar model 302 and video call service 304. However, in further embodiments, avatar model 302 and video call service 304 can be executed in computing cloud 126. In yet other embodiments, avatar model 302 and video call service 304 can be executed by controller 102 of spatial controllable 3D video call system 106. Controller 102 may distribute parts of a face generated by avatar model 302 to display devices 124a-d. In various embodiments, computing device 102, computing cloud 126, and controller 102 of the spatial controllable 3D video call system 106 may include a neural processing unit (NPU) and a streaming processing unit (SPU). The NPU can include specialized hardware circuits designed to accelerate the processing of neural networks used in the AI and machine learning (ML) applications, such as AI avatar models. The SPU can include specialized hardware circuits or accelerators designed to efficiently handle streaming data, especially in real-time applications.

The avatar model 302 may include one or more pre-trained AI models that are configured to generate a data stream. The avatar model 302 may refer to a 3D model that represents a famous person or a fictional character. The data stream may include video data, audio data, and rotation instructions. The video data may include an image of a face associated with the avatar model 302. The audio data may include a speech associated with the avatar model. The rotation instructions may include angles of rotations for the spatial controllable 3D video call system 106, instructions to track a specific person or turn to a specific person during interactions, and others.

In some embodiments, the data stream can be provided to video call services 304. The video call service 304 may generate, based on the data stream, face images and audio data according to a video call Application Programming Interface (API) 306 and transmit the face image and the audio data to computing cloud 126. The video call API 306 may include a set of tools, protocols, and definitions that allows to integrate video call functionality into video call service 304 and video call application 308 running on the spatial controllable 3D video call system 106. The computing cloud 126 may transmit the face image and the audio data to the spatial controllable 3D video call system 106.

In some embodiments, the spatial controllable 3D video call system 106 may be configured to run video call application 308 and data analytics application 310. In some embodiments, video call application 308 and data analytics application 310 can be run on one of display devices 124a-d (for example, display device 124a (shown in FIG. 2)). The video call application 308 may display the face image and play back audio data received from the computing device 102. The display device 124a may capture ambient acoustic signal and ambient video signal. The video call application 308 may transmit the ambient acoustic signal back to the video call service 304 and avatar model 302 running on the computing device 102 via the computing cloud 126. In other embodiments, where controller 112 (shown in FIG. 2) is not integrated into display device 124a, the spatial controllable 3D video call system 106 may include a memory that stores video call application 308 and data analytics application 310 in a form of instructions executable by controller 112.

The data analytics application 310 may analyze the ambient video signal and ambient acoustic signal to determine environmental context. The environmental context may include a total number of people in the room where spatial controllable 3D video call system 106 is located, a number of people trying to talk to the avatar model 302, an emotional state of one or more people, a facial expression of one or more people, gestures of one or more people, an age of one or more people, and so forth. The environmental context may also include a type of space or a room the spatial controllable 3D video call system 106 is located at the moment, for example, a living room, a kitchen, a bedroom, an office, a street, a park, a cafe, and so on.

According to some embodiments of the present disclosure, the avatar model 302 may receive, as input, the environmental context and ambient acoustic signal including speech and voice of people speaking to the avatar model 302. Avatar model 302 may analyze the ambient acoustic signal and the environmental context to generate, as a response, a further data stream to be sent to the spatial controllable 3D video call system 106. The further data stream may include a further image of the face associated with avatar model 302, further audio data including speech associated with avatar model 302, and further rotation instructions.

In some embodiments, one or more persons may ask the avatar model 302 to respond one or more questions. The data analytics application 310 can transmit ambient acoustic signal including the questions to avatar model 302. In response, the avatar model 302 may generate audio and video responses to the questions in the form of images of the face of avatar model 302 and audio data including speech of avatar model 302. The images of the face and speech of avatar model 302 can be displayed by video call application

308. The images of the face may include changes of lips of avatar model 302 corresponding to the speech.

In some embodiments, the data analytics application 310 can analyze ambient video signal and ambient acoustic signal to determine that a person who was talking to avatar model 302 has stop looking at display device 124a of spatial controllable 3D video call system 106. In response to the determination, the data analytics application 310 may send, to the avatar model 302, an indication that the person has stop looking at the image of the avatar model 302. In response to the indication, avatar model 302 may stop sending audio data and video data to the video call application 308.

In some embodiments, the data analytics application 310 can analyze ambient video signal and ambient acoustic signal to determine that a person has turned their head to the display device 124a of spatial controllable 3D video call system 106. In response to the determination, the data analytics application 310 may send, to the avatar model 302, an indication that the person is looking at the avatar model 302. In response to the indication, avatar model 302 may start sending video data and, optionally, audio data, to the video call application 308, thereby causing the video call application 308 to start displaying the image of the face of avatar model 302.

In some embodiments, the data analytics application 310 can analyze ambient video signal and ambient acoustic signal to determine that a person who is talking to avatar model 302 is holding a specific object (for example, a pen, a book, a pet, and so forth). In some embodiments, to recognize a type of the specific object, the data analytics application 310 may send an image of the object to a remote image recognition application. In response to the determination, the data analytics application 310 may send, to the avatar model 302, an indication that the person is holding the specific object. In response to the indication, avatar model 302 may modify responses to the person based on the type of the specific object. For example, avatar model 302 may ask what the pet's name is, what book the person is reading, and so forth.

In some embodiments, the data analytics application 310 can analyze ambient video signal and ambient acoustic signal to determine that a person who is talking to avatar model 302 has made a particular facial expression. In response to the determination, the data analytics application 310 may send, to the avatar model 302, an indication that the person has made the particular facial expression. In response to the indication, avatar model 302 may modify the image of face of avatar model 302 to match the particular facial expression of the person, for example, to smile in response to a smile of the person. If the particular facial expression is unpleasant, avatar model 302 may response with a message containing disapproving language.

In some embodiments, the data analytics application 310 can analyze ambient video signal and ambient acoustic signal to determine that a person who is talking to avatar model 302 has made a particular gesture. In response to the determination, the data analytics application 310 may send, to the avatar model 302, an indication that the person has made the particular gesture. In response to the indication, avatar model 302 may modify the image of the face of avatar model 302 to react to the particular gesture, for example, to smile in response to an "thumbs up" gesture. If the particular gesture is unpleasant, avatar model 302 may respond with a message disapproving the particular gesture of the person.

In some embodiments, the data analytics application 310 can analyze ambient video signal and ambient acoustic signal to determine that voice characteristics of a person who is talking to avatar model 302 have been changed from normal voice characteristics of the person. For example, the data analytics application 310 can determine that the person has raised the voice or has started to speak fast. In response to the determination, the data analytics application 310 may send, to the avatar model 302, an indication that the voice characteristics of the person have been changed and a type of the changes in the voice characteristics of the person. In response to the indication, avatar model 302 may modify the image of the face of avatar model 302 to react to the change, for example, to make a "wonder" facial expression. Avatar model 302 may also generate questions concerning the change of the voice characteristics of the user. In particular, avatar model 302 may ask the person to clarify the reason why the user is upset.

In some embodiments, instead of sending ambient acoustic signal, the data analytics application 310 may send, to avatar model 302, a text message recognized based on the ambient acoustic signal. In these embodiments, the data analytics application 310 may also send to avatar model 302 environmental context indicating the emotional state of the person talking with the avatar model 302.

In some embodiments, in response to receiving ambient acoustic signal, messages, and environmental context, avatar model 302 may send instructions to data analytics application 310 to cause spatial controllable 3D video call system 106 to generate gestures. For example, avatar model 302 may send instructions to generate an "agreement" gesture. In response, data analytics application 310 may send instructions to actuators 118 to tilt axle 108 at a predetermined angle with respect to stand 110 and then return axle 108 to original vertical position. This operation can be repeated a pre-determined number of times to make an impression that avatar model 302 agrees with a person who is talking with avatar model 302. Similarly, avatar model 302 may send instructions to generate "disagreement" gesture. In response, data analytics application 310 may send instructions to actuators 118 to turn axle 108 at a predetermined angle left and then at a predetermined angle right and repeat this operation a predetermined number of times. This movement can make an impression that avatar model 302 disagrees with a person who is talking with avatar model 302.

In some embodiments, data analytics application 310 can analyze ambient video signal to determine that a person who is talking with avatar model 302 has performed a specific movement. For example, data analytics application 310 may recognize that after a question to avatar model 302, the person leans back and starts looking away from the spatial controllable 3D video call system 106. The data analytics application 310 may interpret this move as "person is thinking" and send, to avatar model 302, an indication that the person is thinking. In response, avatar model 302 may wait for a reply from the person for a predetermined time and then ask the person if they find it difficult to respond to the question.

In some embodiments, data analytics application 310 can analyze ambient video signal and ambient acoustic signal to determine that a new person has appeared in the room. Data analytics application 310 can generate, based on the analysis, a unique identifier for the new person. Data analytics application 310 may send, to avatar model 302, as environmental context, an indication that a new person has appeared in room and the unique identifier for the new person. In response, avatar model 302 may send a message greeting the new person. Further, if the new person leaves the room and then comes back, data analytics application 310 may analyze ambient video signal and ambient acoustic signal to determine, based on the unique identifier, that the new person has been previously present in the room. Data analytics application 310 may send, to avatar model 302, an indication that a person with the unique identifier has returned. In response to the indication, avatar model 302 may skip sending a new greeting message to the new person.

In some embodiments, when multiple persons are speaking with avatar model 302 using spatial controllable 3D video call system 106, avatar model 302 may send instruction to data analytics application 310 to orient the line of sight of spatial controllable 3D video call system 106. The line of sight can be oriented towards a currently speaking person or to a person that has a specific unique identifier. Data analytics application 310 may determine that a person has stopped talking or left the room. In response to the determination, data analytics application 310 may wait for a predetermined time (for example, 3 seconds) and then orient the line of sight of spatial controllable 3D video call system 106 to a further person in the room that is nearest to the person.

In some embodiments, the environmental context can be transmitted from data analytics application 310 to avatar model 302 via backend 312 running in computing cloud 126. During interactions of avatar model 302 with one or more people a stream of environmental context can be stored in database 314. The environmental context may include a message of avatar model 302 played back for a person, emotional state of the person in response to the message ("laugh," "not laugh," "surprised," "not surprised," "angry," "not angry," and so on), facial expression of the person ("smile," "not smile," and so on), gesture of the person ("agree" head movement, "disagree" head movement), name of person, age of person, occupation of person, unique identifier of person, and so on. The stream of environmental context can be recorded to the database 314 with a predetermined rate, such as one time per second, two times per period, and so forth. In some embodiments, facial expression can be recorded in a form of a vector corresponding to a form of lips and lids of the person at the moment.

The database 314 can be used for several purposes. For example, the database 314 can be used to retrain avatar model 302 or train a further avatar model. The database 314 can also be used to recognize that avatar model 302 has previously spoken with a particular person.

Figure 4:
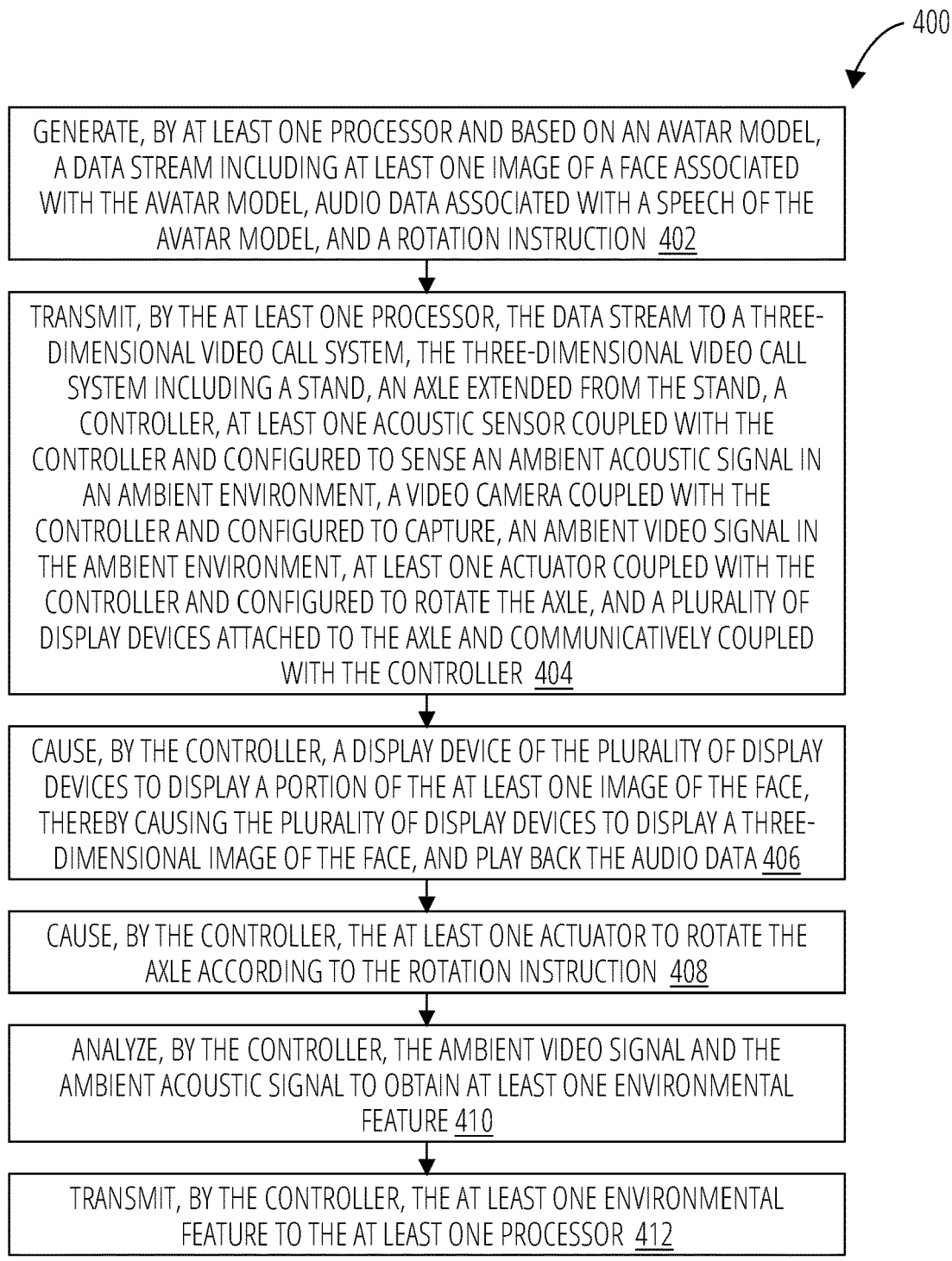
FIG. 4 is a flow chart of a method 400 for providing communications of one or more users with an AI avatar model, according to various example embodiments of the present disclosure.

FIG. 4 is a flow chart of a method 400 for providing communications of one or more users with an AI avatar model, according to various example embodiments of the present disclosure. The method 400 can be implemented by the spatial controllable 3D video call system 106 in the environment 100 shown in FIG. 1. In some embodiments, the operations of the method 400 may be combined, performed in parallel, or performed in a different order. The method 400 may also include additional or fewer operations than those illustrated. The method 400 may be performed by processing logic that may comprise hardware (e.g., decision making logic, dedicated logic, programmable logic, and microcode), software (such as software run on a general-purpose computer system or a dedicated machine), or a combination of both.

In block 402, method 400 may include generating, by at least one processor and based on an avatar model, a data stream including at least one image of a face associated with the avatar model, audio data associated with a speech of the avatar model, and a rotation instruction.

In block 404, method 400 may include transmitting, by the processor, the data stream to a 3D video call system. The 3D video call system may include a stand, an axle extended from the stand, a controller, at least one acoustic sensor coupled with the controller and configured to sense an ambient acoustic signal in an ambient environment, a video camera coupled with the controller and configured to capture an ambient video signal in the ambient environment, at least one actuator coupled with the controller and configured to rotate the axle, and a plurality of display devices attached to the axle and communicatively coupled with the controller.

In block 406, method 400 may include causing, by the controller, a display device of the plurality of display devices to display a portion of the at least one image of the face, thereby causing the plurality of display devices to display a 3D image of the face. The method 400 may include causing, by the controller, the display device to play back the audio data.

In block 408, method 400 may include causing, by the controller, the actuator to rotate the axle according to the rotation instruction.

In block 410, method 400 may include analyzing, by the controller, the ambient video signal and the ambient acoustic signal to obtain at least one environmental feature. The environmental feature may include a total number of people present in the ambient environment and a number of people present in the ambient environment and speaking to the avatar model.

In block 412, method 400 may include transmitting, by the controller, the environmental feature to the processor. The environmental feature may include a position of a person present in the ambient environment and currently speaking to the avatar model. The processor can be configured to determine, based on the position, a further rotation instruction and transmit the further rotation instruction to the 3D video call system, wherein the controller causes the at least one actuator to rotate the axle according to the further rotation instruction.

The environmental feature may include a unique identifier of a person present in the ambient environment. The unique identifier is determined based on one of the following: an image of the person and a voice of the person. The processor can be configured to transmit further instruction to the 3D video call system. Further instruction may include a command to rotate the axle to a position of the person associated with the unique identifier.

The controller can be configured to analyze the ambient video signal and the ambient acoustic signal to detect the presence of a new person in the ambient environment. Based on analysis, the controller may determine at least one characteristic of the new person. The characteristic can be used by the controller to recognize the new person in the ambient video signal and the ambient acoustic signal. The controller may transmit, to the processor, an indication of the presence of the new person in the ambient environment. In response to the indication of the presence of the new person, the processor can transmit a further instruction to the 3D video call system. Further instruction may include a command to rotate the axle to the position of the new person.

The controller can be configured to analyze the ambient acoustic signal and the ambient video signal to detect an emotional state of a person present in the ambient environment and currently speaking to the avatar model. The controller may transmit the emotional state of the person to the processor. The processor can be configured to adjust, based on the emotional state of the person and the avatar model, one of the following: the image of the face and the audio data in the data stream. The adjustment of the image may include changing facial expression of the face associated with the avatar model.

Figure 5:
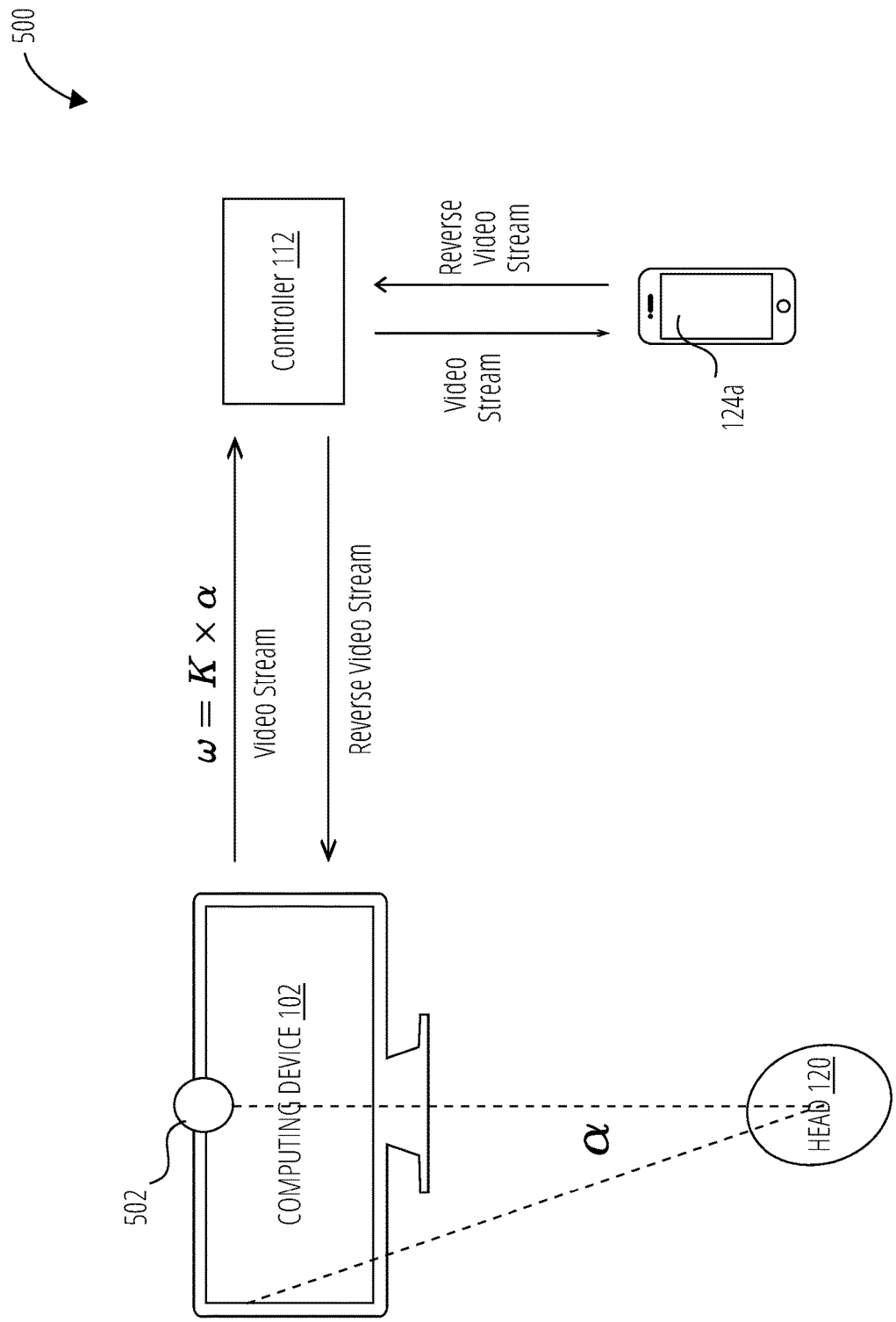
FIG. 5 illustrates details of a user interface for controlling the spatial controllable 3D video call system, according to some example embodiments of the present disclosure.

FIG. 5 illustrates details of a user interface for controlling the spatial controllable 3D video call system 106, according to some example embodiments of the present disclosure. In the example of FIG. 5, the computing device 102 can be configured to transmit video stream captured by a video camera 502 to the controller 112 of the spatial controllable 3D video call system 106 (shown in FIG. 1 and FIG. 2). Controller 112 may transmit the video stream further to the display devices 124a-d. The computing device 102 may receive a reverse video stream captured by a front camera of the display device 124a.

In some embodiments, the computing device 102 may track turns of the head 120 of the user 116 relative to the video camera 502 associated with the computing device 102. For example, computing device 102 may determine angle α of rotation of the head 120 relative to the video camera 502. The computing device 102 may further determine, based on the angle α, an angular speed to for rotation of the axle 108 of the spatial controllable 3D video call system 106 and transmit the angular speed to to the display device 124a. In some embodiments, the angular speed to can be proportional to the angle α and determined as ω=K×α, where K is a pre-determined constant.

The controller 112 may receive the angular speed ω via the communication unit 114 from the computing device 102. In response to receiving the angular speed to, the controller 112 may cause the actuators 118 to rotate the axle 108 with the angular speed to around its axis, thereby rotating the display devices 124a-d in the direction of rotation of the head 120 with an angular speed proportional to angle α at which the user 116 turns the head 120. Thus, because the front camera of the display device 124a is rotated together with axle 108, the user 116 may control orientation of the front camera of the display device 124a, and, correspondingly, control content that user 116 may watch in the video stream obtained from the display device 124a.

In some embodiments, the angle α can be negative when user 116 turns head 120 left with respect to the direction to the video camera 502 and, correspondingly, the angle α can be positive when user 116 turns the head 120 right from the direction to the video camera 502. Correspondingly, when the angular speed w is negative, controller 112 may cause the actuators 118 to rotate the axle 108 left and when the angular speed w is positive, the controller 112 causes the actuators 118 to rotate the axle 108 right. When the user 116 looks at the video camera 502 straight, both the angle α and the angular speed w are zero, so no rotation of the axle 108 is carried out.

In other embodiments, the angular speed w can be calculated using different schemes. For example, the user 116 may make quick head turns in a direction the user 116 desires to rotate the axle 108 and the display devices 124a-d. The computing device 102 may analyze the video stream to determine the number of head turns and calculate, based on the number of head turns, the value of the angle for rotation of the axle 108. Each number of head turns may correspond to a pre-determined value of the angle.

Figure 6:
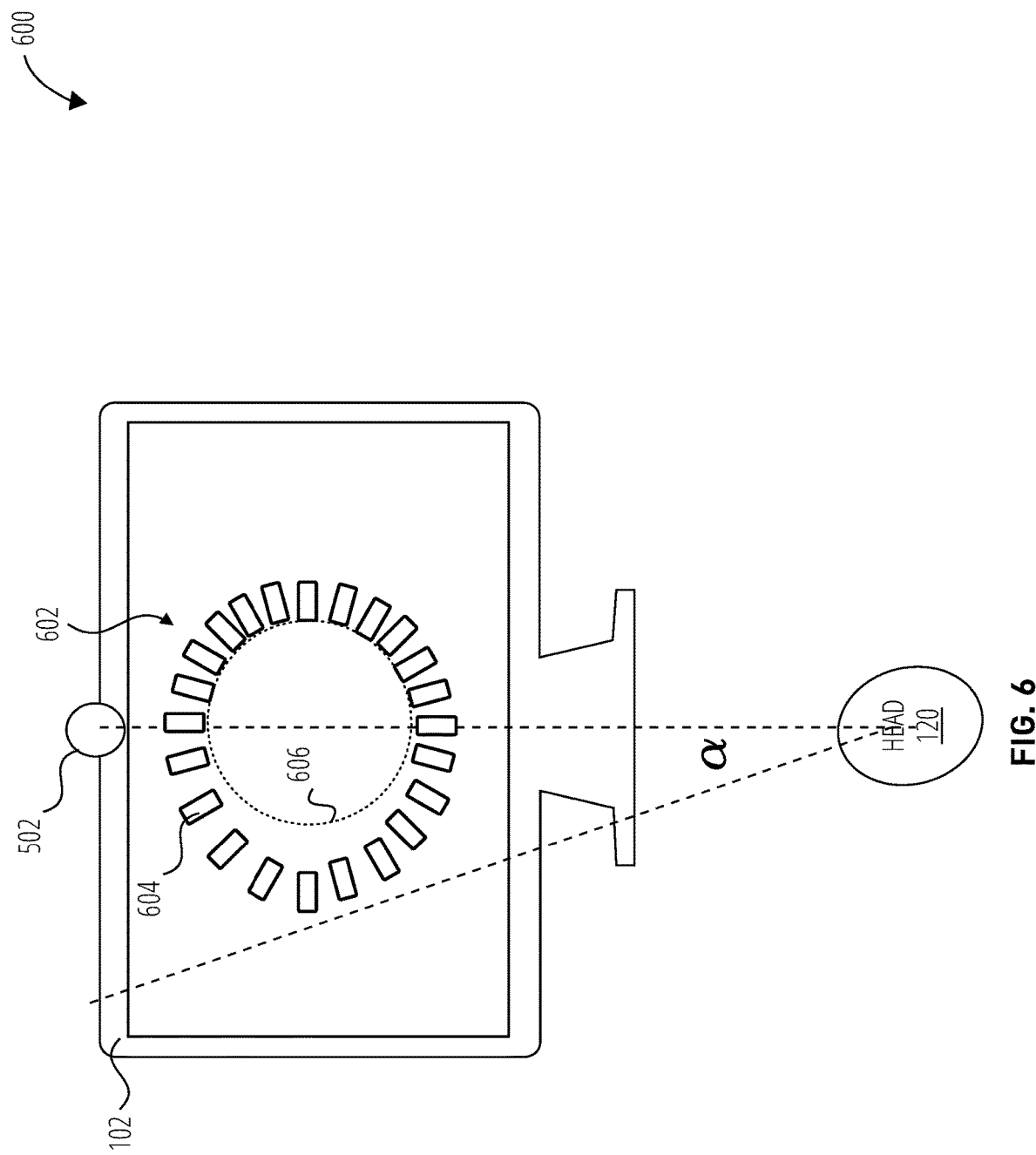
FIG. 6 illustrates further details of the user interface for controlling the spatial controllable 3D video call system, according to some example embodiments of the present disclosure.

FIG. 6 illustrates further details of the user interface for controlling the spatial controllable 3D video call system 106, according to some example embodiments of the present disclosure. In example of FIG. 6, computing device 102 is configured to provide feedback to user 116 with regard to how the head 120 of user 116 is oriented with respect to the video camera 502.

In some embodiments, the computing device 102 may be configured to detect that the user 116 turns the head 120 left or right from the video camera 502. In response to the detection, computing device 102 may display a geometrical FIG. 602. In example of FIG. 6, the geometrical FIG. 602 is formed by rectangles 604 arranged around an imaginary circle 606.

If the head 120 is rotated left, the rectangles 604 located at the left side of the geometrical FIG. 602 can be moved left from the imaginary circle 606, while the rectangles 604 located at the right side of the geometrical FIG. 602 stay around the imaginary circle 606. Similarly, when the head 120 is rotated right, the rectangles 604 located at the right side of the geometrical FIG. 602 can be moved right from the imaginary circle 606, while the rectangles 604 located at the left side of the geometrical FIG. 602 stay around the imaginary circle 606. The distance that the rectangles 604 are moved from the imaginary circle 606 can be proportional to the angle α of the rotation of the head 120 relative to the video camera 502.

When the head 120 is turned back to the direction of the video camera 502, the computing device 102 may display the geometrical FIG. 602, where all rectangles 604 are moved back to the imaginary circle 606. Alternatively, the computing device 102 may hide the geometrical FIG. 602 when the head 120 is oriented straight with respect to the video camera 502.

It should be noted that the interface for controlling the spatial controllable 3D video call system 106 described in FIG. 5 and FIG. 6 can also be used in embodiments involving communications between humans and avatar models (described in FIG. 3). In these embodiments, video camera 502 can be a virtual camera pointed to a video stream of avatar model 302. In the embodiments where the avatar model 302 is executed on computing device 102, computing device 102 may track turns of the head generated by avatar model 302 to determine angular speed w. Computing device 102 may transmit the value of the angular speed w to controller 112 that causes the actuators 118 to rotate the axle 108.

Figure 7:
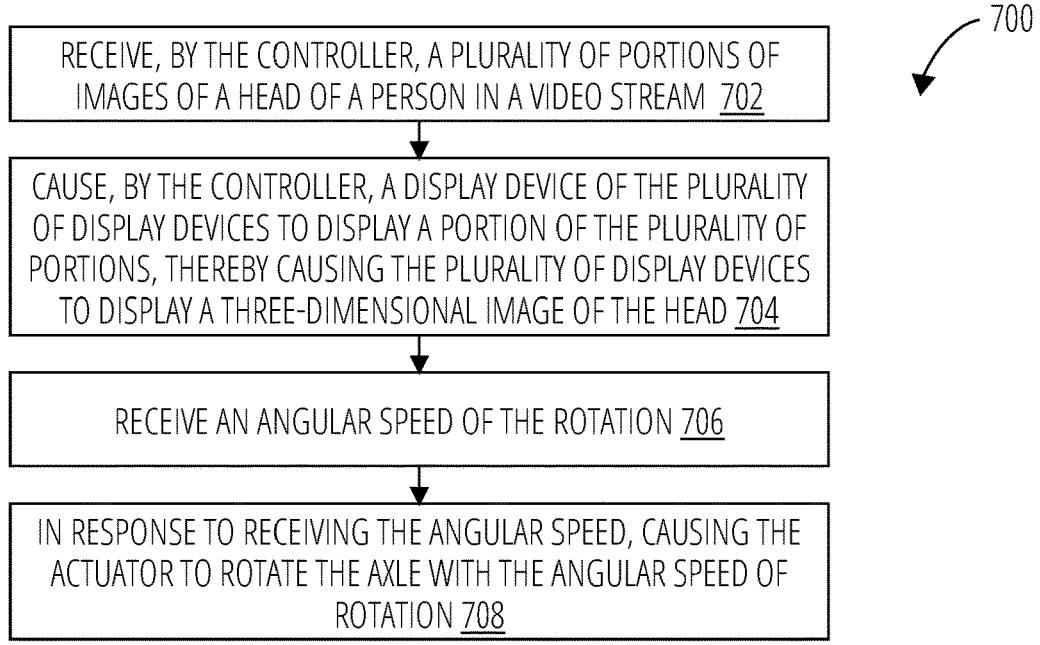
FIG. 7 is a flow chart of a method 700 for displaying an image, according to an example embodiment.

FIG. 7 is a flow chart of method 700 for displaying an image, according to an example embodiment of the present disclosure. The method 700 can be implemented by the spatial controllable 3D video call system 106 in the environment 100 shown in FIG. 1. In some embodiments, the operations of the method 700 may be combined, performed in parallel, or performed in a different order. The method 700 may also include additional or fewer operations than those illustrated. The method 700 may be performed by processing logic that may comprise hardware (e.g., decision making logic, dedicated logic, programmable logic, and microcode), software (such as software run on a general-purpose computer system or a dedicated machine), or a combination of both.

In block 702, method 700 may include receiving, by the controller, a plurality of portions of images of the head of a person in a video stream.

In block 704, method 700 may include causing, by the controller, a display device of the plurality of display devices to display a portion of the plurality of portions, thereby causing the plurality of display devices to display a 3D image of the head.

In block 706, method 700 may include receiving an angular speed of rotation.

In block 708, method 700 may include, in response to the receiving the angular speed, causing the actuator to rotate the axle with an angular speed of rotation.

The controller can be configured to receive the video stream and the angular speed from a remote computing device associated with the person. The remote computing device can be configured to track the orientation of the head of the person and determine, based on the orientation of the head of the person, the angular speed of the rotation. The angular speed of rotation can be proportional to an angle of rotation of the head of the person relative to a camera associated with the remote computing device.

The remote computing device can be configured to display a geometrical figure having a side elongated in a direction of the rotation of the head of the person. The side can be elongated proportionally with respect to the angle of rotation of the head of the person. The remote computing device can also be configured to display a further video stream captured by a further camera associated with the display device of the plurality of display devices. The display device may include a smartphone.

In some other embodiments, the angular speed of rotation of the axle can be determined based on a speed of rotation of the head of the person. In yet other embodiments, the angular speed of rotation of the axle can be determined based on a number of turns of the head of the person.

Figure 8:
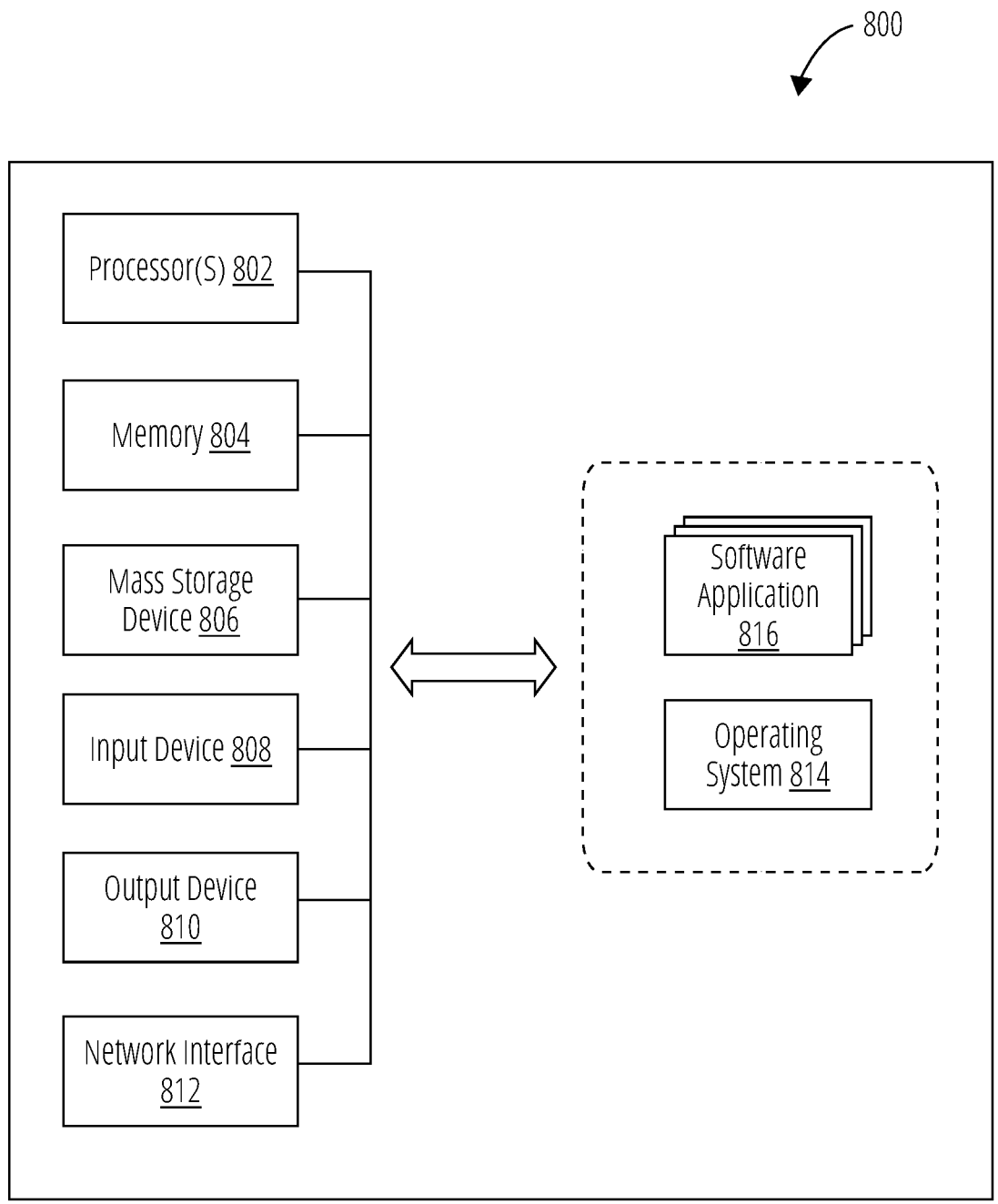
FIG. 8 is a high-level block diagram illustrating an example computer system, within which a set of instructions for causing the machine to perform any one or more of the methodologies discussed herein can be executed.

FIG. 8 is a high-level block diagram illustrating an example computer system 800, within which a set of instructions for causing the machine to perform any one or more of the methodologies discussed herein can be executed. The computer system 800 may include, refer to, or be an integral part of, one or more of a variety of types of devices, such as a general-purpose computer, a desktop computer, a laptop computer, a tablet computer, a netbook, a mobile phone, a smartphone, a personal digital computer, a smart television device, and a server, among others. In some embodiments, the computer system 800 is an example of a computing device 102 and computing cloud 126 shown in FIG. 1 and display devices 124*a*-*d* shown in FIG. 2. Notably, FIG. 8 illustrates just one example of the computer system 800 and, in some embodiments, the computer system 800 may have fewer elements/modules than shown in FIG. 8 or more elements/modules than shown in FIG. 8.

The computer system 800 may include one or more processor(s) 802, a memory 804, one or more mass storage devices 806, one or more input devices 808, one or more output devices 810, and a network interface 812. The processor(s) 802 are, in some examples, configured to implement functionality and/or process instructions for execution within the computer system 800. For example, the processor(s) 802 may process instructions stored in the memory 804 and/or instructions stored on the mass storage devices 806. Such instructions may include components of an operating system 814 or software applications 816. The processor(s) 802 may include an NPU and an SPU. The computer system 800 may also include one or more additional components not shown in FIG. 8, such as a body, a power supply, a power supply, a global positioning system (GPS) receiver, and so forth.

The memory 804, according to one example, is configured to store information within the computer system 800 during operation. The memory 804, in some example embodiments, may refer to a non-transitory computer-readable storage medium or a computer-readable storage device. In some examples, the memory 804 is a temporary memory, meaning that a primary purpose of the memory 804 may not be long-term storage. The memory 804 may also refer to a volatile memory, meaning that the memory 804 does not maintain stored contents when the memory 804 is not receiving power. Examples of volatile memories include random access memories (RAM), dynamic random access memories (DRAM), static random access memories (SRAM), and other forms of volatile memories known in the art. In some examples, the memory 804 is used to store program instructions for execution by the processor(s) 802. The memory 804, in one example, is used by software (e.g., the operating system 814 or the software applications 816). Generally, the software applications 816 refer to software Applications suitable for implementing at least some operations of the methods for displaying 3D head shape images as described herein.

The mass storage devices 806 may include one or more transitory or non-transitory computer-readable storage media and/or computer-readable storage devices. In some embodiments, the mass storage devices 806 may be configured to store greater amounts of information than the memory 804. The mass storage devices 806 may further be configured for long-term storage of information. In some examples, the mass storage devices 806 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

The input devices 808, in some examples, may be configured to receive input from a user through tactile, audio, video, or biometric channels. Examples of the input devices 808 may include a keyboard, a keypad, a mouse, a trackball, a touchscreen, a touchpad, a microphone, one or more video cameras, image sensors, fingerprint sensors, or any other device capable of detecting an input from a user or other source, and relaying the input to the computer system 800, or components thereof.

The output devices 810, in some examples, may be configured to provide output to a user through visual or auditory channels. The output devices 810 may include a video graphics adapter card, a liquid crystal display (LCD) monitor, a light emitting diode (LED) monitor, an organic LED monitor, a sound card, a speaker, a lighting device, a LED, a projector, or any other device capable of generating output that may be intelligible to a user. The output devices 810 may also include a touchscreen, a presence-sensitive display, or other input/output capable displays known in the art.

The network interface 812 of the computer system 800, in some example embodiments, can be utilized to communicate with external devices via one or more data networks such as one or more wired, wireless, or optical networks including, for example, the Internet, intranet, LAN, WAN, cellular phone networks, Bluetooth radio, and an IEEE 902.11-based radio frequency network, Wi-Fi networks®, among others. The network interface 812 may be a network interface card, such as an Ethernet card, an optical transceiver, a radio frequency transceiver, or any other type of device that can send and receive information.

The operating system 814 may control one or more functionalities of the computer system 800 and/or components thereof. For example, the operating system 814 may interact with the software applications 816 and may facilitate one or more interactions between the software applications 816 and components of the computer system 800. As shown in FIG. 8, the operating system 814 may interact with or be otherwise coupled to the software applications 816 and components thereof. In some embodiments, the software applications 816 may be included in the operating system

814. In these and other examples, virtual modules, firmware, or software may be part of the software applications 816.

Thus, systems and methods for providing an embodied interface for face-to-face communication between humans and artificial intelligence agents have been described. Although embodiments have been described with reference to specific example embodiments, it will be evident that various modifications and changes can be made to these example embodiments without departing from the broader spirit and scope of the present Application. Accordingly, the specification and drawings are to be regarded in an illustrative rather than a restrictive sense.

What is claimed is:

1. A method comprising:
generating, by at least one processor and based on an avatar model, a data stream including at least one image of a face associated with the avatar model, audio data associated with a speech of the avatar model, and a rotation instruction;
transmitting, by the at least one processor, the data stream to a three-dimensional video call system, the three-dimensional video call system including:
a stand;
an axle extended from the stand;
a controller;
at least one acoustic sensor coupled with the controller and configured to sense an ambient acoustic signal in an ambient environment;
a video camera coupled with the controller and configured to capture an ambient video signal in the ambient environment;
at least one actuator coupled with the controller and configured to rotate the axle; and
a plurality of display devices attached to the axle and communicatively coupled with the controller, wherein the controller is configured to:
cause a display device of the plurality of display devices to:
display a portion of the at least one image of the face, thereby causing the plurality of display devices to display a three-dimensional image of the face; and
play back the audio data;
cause the at least one actuator to rotate the axle according to the rotation instruction; and
analyze the ambient video signal and the ambient acoustic signal to obtain at least one environmental feature; and
transmit the at least one environmental feature to the at least one processor.

2. The method of claim 1, wherein the at least one environmental feature includes a total number of people present in the ambient environment.

3. The method of claim 1, wherein the at least one environmental feature includes a number of people present in the ambient environment and speaking to the avatar model.

4. The method of claim 1, wherein:
the at least one environmental feature includes a position of a person present in the ambient environment and currently speaking to the avatar model; and
the at least one processor is configured to:
determine, based on the position, a further rotation instruction; and
transmit the further rotation instruction to the three-dimensional video call system, wherein the controller causes the at least one actuator to rotate the axle according to the further rotation instruction.

5. The method of claim 1, wherein:
the at least one environmental feature includes a unique identifier of a person present in the ambient environment, the unique identifier being determined by the controller based on one of the following: an image of the person and a voice of the person; and
the at least one processor is configured to transmit a further instruction to the three-dimensional video call system, the further instruction including a command to rotate the axle to a position of the person associated with the unique identifier.

6. The method of claim 1, wherein the controller is configured to:
analyze the ambient video signal and the ambient acoustic signal to detect a presence of a new person in the ambient environment;
determine, based on the ambient video signal and the ambient acoustic signal, at least one characteristic of the new person, the at least one characteristic to be used by the controller to recognize the new person in the ambient video signal and the ambient acoustic signal; and
transmit, to the at least one processor, an indication of presence of the new person in the ambient environment.

7. The method of claim 6, wherein in response to the indication of presence of the new person, the at least one processor is configured to transmit a further instruction to the three-dimensional video call system, the further instruction including a command to rotate the axle to a position of the new person.

8. The method of claim 1, wherein:
the controller is configured to:
analyze the ambient acoustic signal and the ambient video signal to detect an emotional state of a person present in the ambient environment and currently speaking to the avatar model; and
transmit the emotional state of the person to the at least one processor; and
the at least one processor is configured to adjust, based on the emotional state of the person and the avatar model, one of the following: the at least one image and the audio data in the data stream.

9. The method of claim 1, wherein the adjustment of the at least one image includes changing a facial expression of the face associated with the avatar model.

10. The method of claim 1, wherein the at least one processor is located remotely with respect to the three-dimensional video call system.

11. A computing apparatus comprising:
at least one processor; and
a memory storing instructions that, when executed by the at least one processor, configure the apparatus to:
generate, based on an avatar model, a data stream including at least one image of a face associated with the avatar model, audio data associated with a speech of the avatar model, and a rotation instruction;
transmit the data stream to a three-dimensional video call system, the three-dimensional video call system including:
a stand;
an axle extended from the stand;
a controller;

at least one acoustic sensor coupled with the controller and configured to sense an ambient acoustic signal in an ambient environment;
a video camera coupled with the controller and configured to capture an ambient video signal in the ambient environment;
at least one actuator coupled with the controller and configured to rotate the axle; and
a plurality of display devices attached to the axle and communicatively coupled with the controller, wherein the controller is configured to:
cause a display device of the plurality of display devices to:
display a portion of the at least one image of the face, thereby causing the plurality of display devices to display a three-dimensional image of the face; and
play back the audio data;
cause the at least one actuator to rotate the axle according to the rotation instruction; and
analyze the ambient video signal and the ambient acoustic signal to obtain at least one environmental feature; and
transmit the at least one environmental feature to the at least one processor.

12. The computing apparatus of claim 11, wherein the at least one environmental feature includes a total number of people present in the ambient environment.

13. The computing apparatus of claim 11, wherein the at least one environmental feature includes a number of people present in the ambient environment and speaking to the avatar model.

14. The computing apparatus of claim 11, wherein:
the at least one environmental feature includes a position of a person present in the ambient environment and currently speaking to the avatar model; and
the at least one processor is configured to:
determine, based on the position, a further rotation instruction; and
transmit the further rotation instruction to the three-dimensional video call system, wherein the controller causes the at least one actuator to rotate the axle according to the further rotation instruction.

15. The computing apparatus of claim 11, wherein:
the at least one environmental feature includes a unique identifier of a person present in the ambient environment, the unique identifier being determined by the controller based on one of the following: an image of the person and a voice of the person; and
the at least one processor is configured to transmit a further instruction to the three-dimensional video call system, the further instruction a command to rotate the axle to a position of the person associated with the unique identifier.

16. The computing apparatus of claim 11, wherein the controller is configured to:
analyze the ambient video signal and the ambient acoustic signal to detect a presence of a new person in the ambient environment;
determine, based on the ambient video signal and the ambient acoustic signal, at least one characteristic of the new person, the at least one characteristic to be used by the controller to recognize the new person in the ambient video signal and the ambient acoustic signal; and transmit, to the at least one processor, an indication of presence of the new person in the ambient environment.

17. The computing apparatus of claim 16, wherein in response to the indication of presence of the new person, the at least one processor is configured to transmit a further instruction to the three-dimensional video call system, the further instruction being a command to rotate the axle to a position of the new person.

18. The computing apparatus of claim 11, wherein:
the controller is configured to:
analyze the ambient acoustic signal and the ambient video signal to detect an emotional state of a person present in the ambient environment and currently speaking to the avatar model; and
transmit the emotional state of the person to the at least one processor; and
the at least one processor is configured to adjust, based on the emotional state of the person and the avatar model, one of the following: the at least one image and the audio data in the data stream.

19. The computing apparatus of claim 11, wherein the adjustment of the at least one image includes changing a facial expression of the face associated with the avatar model.

20. A non-transitory computer-readable storage medium, the computer-readable storage medium including instructions that when executed by a computer, cause the computer to:
generate, by at least one processor and based on an avatar model, a data stream including at least one image of a face associated with the avatar model, audio data associated with a speech of the avatar model, and a rotation instruction;
transmit, by the at least one processor, the data stream to a three-dimensional video call system, the three-dimensional video call system including:
a stand;
an axle extended from the stand;
a controller;
at least one acoustic sensor coupled with the controller and configured to sense an ambient acoustic signal in an ambient environment;
a video camera coupled with the controller and configured to capture an ambient video signal in the ambient environment;
at least one actuator coupled with the controller and configured to rotate the axle; and
a plurality of display devices attached to the axle and communicatively coupled with the controller, wherein the controller is configured to:
cause a display device of the plurality of display devices to:
display a portion of the at least one image of the face, thereby causing the plurality of display devices to display a three-dimensional image of the face; and
play back the audio data;
cause the at least one actuator to rotate the axle according to the rotation instruction; and
analyze the ambient video signal and the ambient acoustic signal to obtain at least one environmental feature; and
transmit the at least one environmental feature to the at least one processor.

* * * * *